United States Patent
Sauer et al.

[11] Patent Number: 5,878,548
[45] Date of Patent: Mar. 9, 1999

[54] CORNER PROTECTOR FOR PROTECTING THE TOP CORNERS OF STACKS OF LUMBER

[75] Inventors: Robert J. Sauer, Mullica Hill, N.J.; John W. Rudibaugh, West Chester, Pa.

[73] Assignee: Pennsy Corporation, West Chester, Pa.

[21] Appl. No.: 903,738

[22] Filed: Jul. 31, 1997

[51] Int. Cl.[6] ........................................... B65B 61/00
[52] U.S. Cl. ................ 53/410; 53/139.6; 53/139.7; 206/453; 206/586; 410/41; 410/98; 410/99
[58] Field of Search .................... 53/399, 139.6, 53/139.7, 410; 206/453, 586; 410/41, 98, 99; 414/373, 333; 105/160.5

[56] References Cited

U.S. PATENT DOCUMENTS

| | | | |
|---|---|---|---|
| 3,199,709 | 8/1965 | Morrison et al. | 206/453 X |
| 4,292,901 | 10/1981 | Cox | 206/586 X |
| 4,877,673 | 10/1989 | Eckel et al. | 206/586 X |
| 4,938,357 | 7/1990 | Schmidt | 206/586 X |
| 5,289,668 | 3/1994 | Meyer | 53/139.7 X |
| 5,311,996 | 5/1994 | Duffy et al. | 206/586 X |

*Primary Examiner*—Linda Johnson
*Attorney, Agent, or Firm*—John F. A. Earley; John F. A. Earley III; Harding, Earley, Follmer & Frailey

[57] ABSTRACT

A corner protector for protecting the top corners of stacks of lumber from being indented or frayed by tie-down cables in a railroad freight car, comprises a sidewall connected at its top to a top wall at right angles to the sidewall along a fold line so that the sidewall is adapted to contact the side of a stack of lumber and the top wall is adapted to contact the top of the stack of lumber, cable alignment tabs on top of the top wall for aligning the tie down cable, cable retention fingers mounted on the sidewall for capturing and detaining the tie down cable, whereby when the protector is mounted on the corner of a stack of lumber it is protected against being contacted and indented by the tie down cable, the cable is protected against wearing and fraying caused by contacting the corner of the stack of lumber, and the corner protector may be installed without disconnecting the cable by loosening the cable and inserting the protector under the cable and mounting the protector on the top corner of the stack of lumber.

6 Claims, 2 Drawing Sheets

CORNER PROTECTOR FOR PROTECTING THE TOP CORNERS OF STACKS OF LUMBER

BACKGROUND OF THE INVENTION

1. Field of the Invention

This invention relates to a corner protector for protecting the top corners of stacks of lumber from being indented or frayed by tie down cables, and is more particularly concerned with protecting the corners of stacks of lumber on railroad freight cars where without the corner protector the corners of the stacks of lumber may be indented or frayed by the tie down cables as the railroad freight car is traveling along.

2. Description of the Prior Art

Lumber tie down cables are typically found on center beam bulkhead freight cars which are used to transport stacks of pieces of lumber. When the tie down cables are tied down too tightly they cause indentations of the pieces of lumber especially at the top corners of a stack of lumber. If the tie down cables are not tied down tightly enough, the movement of the freight car causes movement of the tie down cables and the pieces of lumber to cause fraying of the lumber and of the tie down cable. Conventional protectors are made of steel and wear on the cables. This is undesirable.

SUMMARY OF THE INVENTION

It is an object of this invention to overcome the problems of the prior art and to provide a corner protector for protecting the top corners of a stack of lumber from indentations and fraying and to protect the tie down cable from wearing and fraying by contacting the corner and rubbing against the corner of the stack of lumber.

It is also an object of the invention to provide a corner protector that may be installed without disconnecting the tie down cable, but instead may be installed by just loosening the cable, inserting the corner protector under the cable, and then tightening the cable.

The objects of the invention are accomplished by providing a corner protector which offers a 1 and ⅛th inch separation between the cable and the lumber stack, which includes cable alignment tabs, and has a unique arrangement of cable retention features which allow for installation of the protector without disconnection of the ⅜th inch diameter tie down cable.

Further, the lightweight design of the corner protector offers greater safety to ground workers should the protector fall from its position.

Also, the polymer material of which the protector is made has a high degree of wear and permanent set resistance, as well as the ability to protect the ⅜th inch diameter tie down cable from wear and fraying. Flexibility of the protector allows it to be deformed and spring back to original shape as opposed to conventional metal protectors which bend.

DETAILED DESCRIPTION OF THE DRAWINGS

Figure 1:
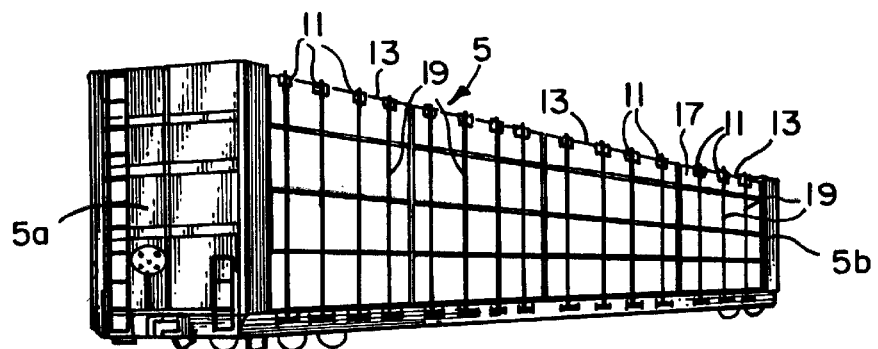
FIG. 1 is a view in perspective of a typical center beam bulkhead railroad flat car.

Turning now to the drawings, there is shown in FIG. 1 a typical center beam bulkhead railroad flat car 5 having bulkheads 5a and 5b, corner protectors 11 for protecting the top corners 13 of a stack 15 of lumber 17 from being indented or frayed by a tie down cable 19 in a railroad freight car.

Figure 2:
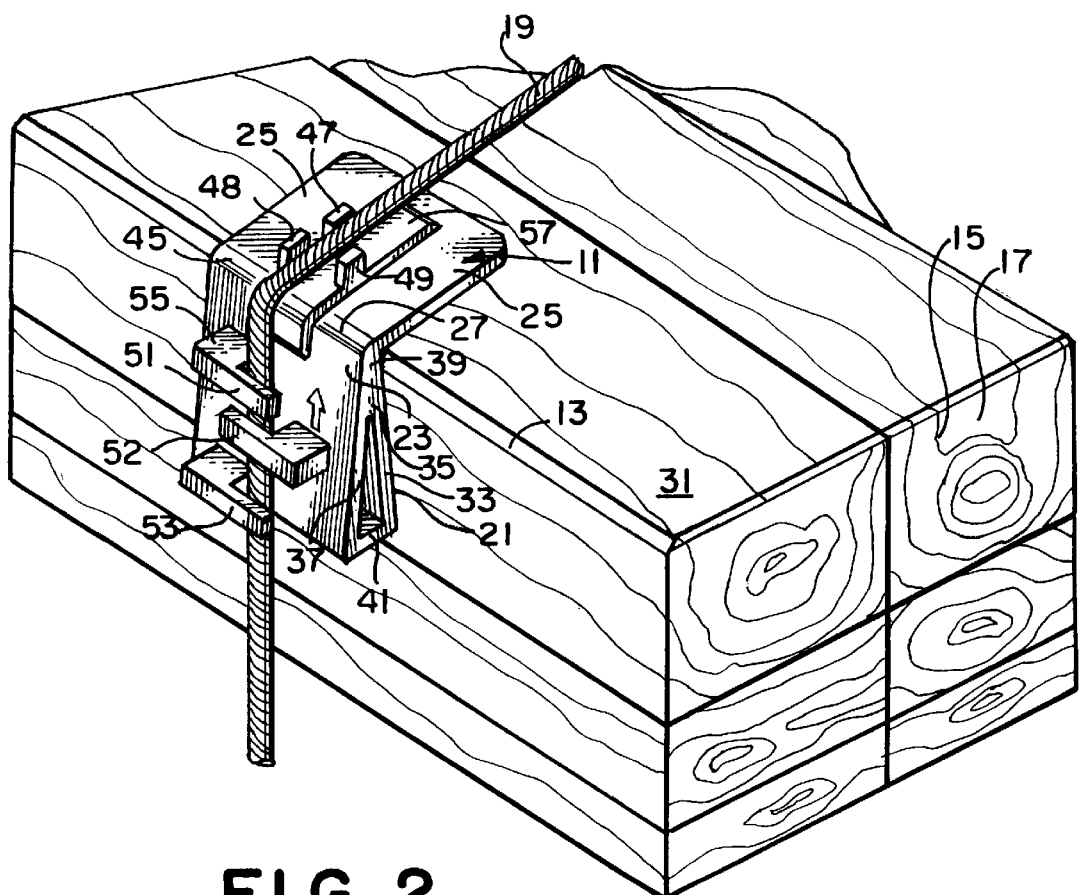
FIG. 2 is an isometric drawing of a corner protector constructed in accordance with this invention and mounted on a top corner of a slack of lumber.

Referring more particular by to FIG. 2, corner protector 11 comprises a vertical side wall member 21 connected at its top portion 23 to a top wall 25 at right angles to the side wall member 21 along a fold line 27 so that the side wall member 21 is adapted to contact the side of the lumber stack 15 and the top wall 25 is adapted to contact the top 31 of lumber stack 15.

The side wall member 21 has a inner side wall portion 33 which is vertical and which has a first top portion 35. An offset outer side wall portion 37 has a second top portion 39 which is connected to the first top portion 35. A bottom side wall portion 41 extends between the bottoms of the outer side wall portion 37 and the inner side wall portion 33 to position the outer side wall portion 37 at an offset angle 43 (FIG. 3) from the vertical inner side wall portion 33 to hold the cable 19 away from contact with the lumber 17.

The horizontal top wall 25 is connected to the top portions of the side wall portion 33 at a right angle for contacting the top surface of the stack 15 of lumber, and the horizontal top wall 25 forms a corner 45 with the inner side wall portion 33.

Figure 3:
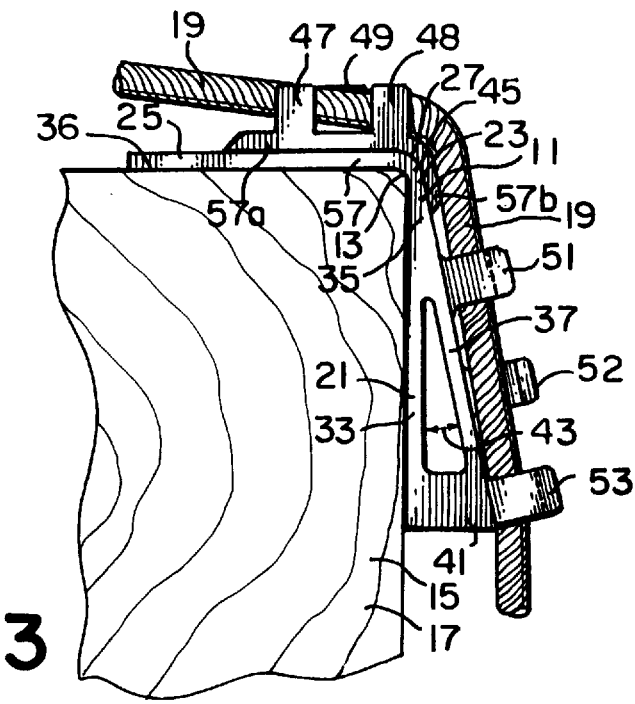
FIG. 3 is a partial view in side elevation showing the corner protector mounted on the top corner of a stack of lumber.
Figure 4:
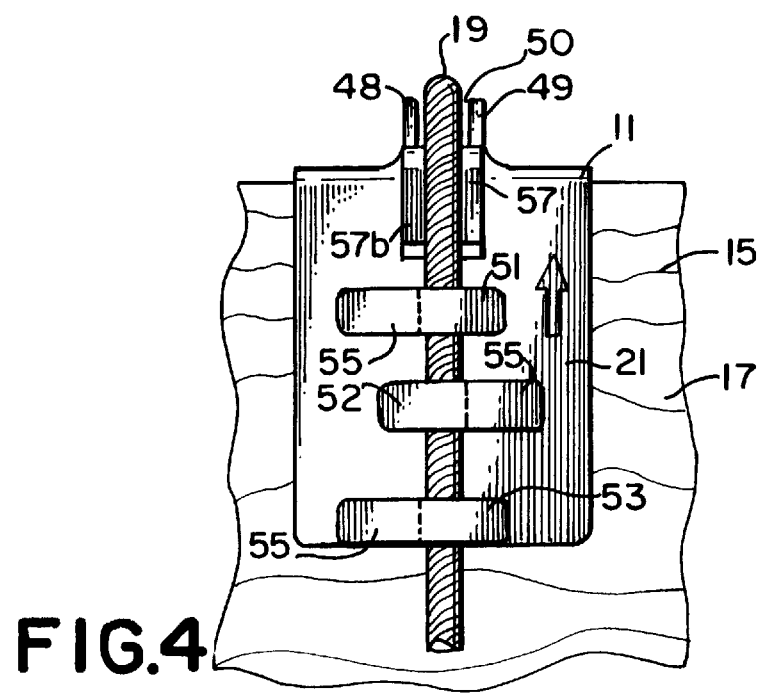
FIG. 4 is a view in front elevation of the corner protector mounted on the top corner of a stack of lumber.

Referring now more particularly to FIGS. 3 and 4, cable alignment tabs 47–49 extend upwardly from the top of the top wall 25 for aligning the tie down cable 19, and cable retention fingers 51–53 are mounted on the outer side wall portion 37 for capturing and retaining the tie down cable 19.

When the corner protector 11 is mounted on the corner 13 of a stack 15 of lumber 17, the stack of lumber is protected against being contacted and indented or frayed by the tie down cable 19. Also, the cable 19 is protected against wearing and fraying by any contact with the corner of the stack of lumber.

The corner protector 11 may be installed on the corner 13 of a stack 15 of lumber 17 without disconnecting the cable by just loosening the cable 19 and inserting the corner protector 11 under the cable 19 and mounting the corner protector 11 on the top corner 13 of the stack 15 of lumber 17. Then the cable 19 is tightened by turning the winch located at the side of the railroad car with the inner end of the cable 19 having been anchored on the center beam of the car.

Cable alignment tabs 47–49 comprise two upright tabs 47 and 48 which are in alignment, and a third upright tab 49 which is spaced away from the two aligned tabs 47 and 48 by at least the diameter of the cable 19 so as to receive the cable 19 in the space 50 between the two aligned tabs 47, 48 and the third tab 49.

The cable retention fingers 51–53 are provided with support bases 55 extending perpendicularly from the outer side wall portion 37, and the retention fingers 51–53 extend horizontally and at a right angle from the outer end of the support bases 55. Two of the retention fingers 51, 53 are mounted in alignment on the outer side wall portion 37 with their fingers pointing in the same direction, and a third retention finger 52 is mounted on the outer side wall portion 37 spaced way from the two aligned fingers 51, 53 and finger 52 is pointed in a direction opposite to the direction of the two aligned fingers 51, 53 and form a space between the aligned tension fingers 51, 53 and the third retention finger 52 so that the fingers 51–53 capture and retain the tie down cable 19 in the space between them.

The side wall member 21 comprises a vertical inner side wall portion 33, a bottom side wall portion 41 extending outwardly from the bottom of the vertical inner side wall portion 33, and an outer side wall portion 37 extending at an angle between the bottom wall 41 and the top portion of the inner side wall portion 33, with the fingers 51–53 being mounted on the outer side wall portion 37, whereby the cable 19 may be threaded through the fingers 51–53 on the outer side wall portion 37 and through the tabs 47–49 mounted on top wall 25.

An L-shaped reinforcing plate 57 is provided with the long leg 57a of the L being mounted on the top surface of top wall 25 with the cable alignment tabs 47–49 extending upwardly therefrom, and with the short leg 57b mounted on the outer surface of outer side wall portion 37 with the fingers 51–53 mounted thereon.

Corner protector 11 is made of synthetic plastic, preferably a thermoplastic such as urethane.

The method of using the corner protector 11 to protect the top corners 13 of a stack 15 of lumber 17 from indentations, wearing and fraying from a tie-down cable 19 in a center beam bulkhead flat railroad freight car comprises the steps of providing a corner protector 11, placing the corner protector 11 on the top corner 13 of a stack 15 of lumber, threading a tie down cable 19 through the retention fingers 51–53 of the outer side wall portion 37, threading the cable 19 through the alignment tabs 47–49 of the top wall 25, and tightening down the tie down cable 19 to hold the corner protector 11 in place on the top corner 13 of the stack 15 of lumber 17.

We claim:

1. A corner protector for protecting the top corners of a stack of lumber from being indented or frayed by tie-down cables in railroad freight cars, comprising
   a top wall,
   sidewall means connected at its top to the top wall at right angles along a fold line so that the sidewall means is adapted to contact the side of the stack of lumber and the top wall is adapted to contact the top of the stack of lumber,
   said sidewall means having a vertical inner sidewall with a first top portion,
   said sidewall vertical inner sidewall having an inner sidewall bottom portion,
   an offset outer sidewall having a second top portion connected to said first top portion,
   said offset outer sidewall having an outer sidewall bottom portion,
   and a bottom extending between the bottom portions of the outer and inner sidewalls to position the outer sidewall at an offset angle away from the vertical inner sidewall,
   said side wall means being wedge shaped with its bottom being wider than the top to hold the tie down cable away from the sides of the stack of lumber to prevent damage to the lumber,
   said top wall being horizontal and forming a corner with the inner sidewall,
   cable alignment tab means on top of the top wall for aligning the tie down cable, and
   cable retention finger means mounted on the outer sidewall for capturing and retaining the tie down cable,
   whereby, when the protector is mounted on the corner of a stack of lumber, the lumber is protected against being contacted and indented by the tie down cable, the cable is protected against wearing and fraying caused by the cable contacting and rubbing against the corner of the stack of lumber, and the protector may be installed without disconnecting the cable by loosening the cable and inserting the protector under the cable and mounting the protector on the top corner of the stack of lumber, and then tightening the cable.

2. The corner protector of claim 1,
   said cable alignment tab means comprising
   two upright tabs in alignment,
   and a third upright tab spaced from the two aligned tabs by at least the diameter of the cable so as to receive the cable in the space between the two aligned tabs and the third tab.

3. The corner protector of claim 1,
   said retention finger means having a support base extending perpendicularly from the outer side wall member and retention fingers extending horizontally and at a right angle from the outer end of the support base,
   two of the retention fingers being mounted in alignment on the outer sidewall with their fingers pointing in the same direction,
   a third retention finger being mounted on the outer sidewall spaced away from the two aligned retention fingers and with its finger pointed in a direction opposite to the two aligned fingers so as to form a space between said two aligned retention fingers and said third retention finger so that the fingers capture and retain the tie down cable in said space.

4. A corner protector for protecting the top corners of stacks of lumber from being indented or frayed by tie-down cables in railroad freight cars, comprising
   a top wall,
   sidewall means connected at its top to the top wall at right angles along a fold line so that the sidewall means is adapted to contact the side of a stack of lumber and the top wall is adapted to contact the top of the stack of lumber,
   said sidewall means having a vertical inner sidewall with a first top portion,
   an offset outer sidewall having a second top portion connected to said first top portion,
   and a bottom wall extending between the bottoms of the outer and inner sidewalls to position the outer sidewall at an offset angle from the vertical inner sidewall,
   said top wall being horizontal and forming a corner with the inner sidewall,
   cable alignment tab means on top of the top wall for aligning the tie down cable, and
   cable retention finger means mounted on the outer sidewall for capturing and retaining the tie down cable,
   whereby, when the protector is mounted on the corner of a stack of lumber, the lumber is protected against being contacted and indented by the tie down cable, the cable is protected against wearing and fraying caused by contacting the corner of the stack of lumber, and the protector may be installed without disconnecting the cable by loosening the cable and inserting the protector under the cable and mounting the protector on the top corner of the stack of lumber and then tightening the cable, said cable alignment tab means comprising two upright tabs in alignment, and a third upright tab spaced from the two aligned tabs by at least the diameter of the cable so as to receive the cable in the space between the two aligned tabs and the third tab, said retention finger means having a support base extending perpendicularly from the outer side wall member and retention fingers extending horizontally and at a right angle from the outer end of the support base, two of the retention fingers being mounted in alignment on the outer sidewall with their finger pointing in the same direction, and a third retention finger being mounted on the outer sidewall spaced away from the two aligned retention fingers and with its finger pointed in a direction opposite to the two aligned fingers so as to form a space between said two aligned retention fingers and said third retention finger so that the fingers capture and retain the tie down cable in said space.

5. A corner protector and railroad car combination for protecting the top corner of a stack of lumber on a railroad car from being indented or frayed by tie-down cables, comprising a railroad freight car, a stack of lumber on the railroad freight car, a tie-down cable having each end mounted on the freight car, and a corner protector comprising a top wall, sidewall means connected at its top to the top wall at right angles along a fold line so that the sidewall means is adapted to contact the side of the stack of lumber and the top wall is adapted to contact the top of the stack of lumber, said side wall means being wedge shaped with its bottom being wider than the top to form a wedge to hold the tie down cable away from the sides of the stack of lumber, said wedge shape of the side wall means being hollow, said top wall being horizontal and forming a corner with the inner sidewall, cable alignment tab means on top of the top wall for aligning the tie down cable, and cable retention finger means mounted on the sidewall means capturing and retaining the tie down cable, the wedge shape of said sidewall means holding the tie down cable away from the side of the stack of lumber, whereby, when the protector is mounted on the corner of a lumber stack, the lumber is protected against being contacted and indented by the tie down cable, the cable is protected against wearing and fraying caused by contacting the corner of the stack of lumber, and the protector may be installed without disconnecting the cable by loosening the cable and inserting the protector under the cable and mounting the protector on the top corner of the stack of lumber, and then tightening the cable.

6. A method of protecting the top corners of a stack of lumber from indentations from a tie-down cable in a railroad freight car comprising the steps of loading a stack of lumber on the railroad freight car, fastening a both ends of tie-down cable on the railroad freight car, contacting the load of lumber with the tie-down cable, and providing a corner protector comprising a top wall, sidewall means connected at its top to a top wall at right angles along a fold line so that the sidewall means is adapted to contact the side of the stack of lumber and the top wall is adapted to contact the top of the stack of lumber, said sidewall means having a vertical inner sidewall with a first top portion, an offset outer sidewall having a second top portion connected to said first top portion, and a bottom wall extending between the bottoms of the outer and inner sidewalls to position the outer sidewall at an offset angle from the vertical inner sidewall, said top wall being horizontal and forming a corner with the inner sidewall, cable alignment tab means on top of the top wall for aligning the tie down cable, and cable retention finger means mounted on the outer sidewall for capturing and retaining the tie down cable, whereby when the protector is mounted on the corner of a stack of lumber it is protected against being contacted and indented by the tie down cable, the cable is protected against wearing and fraying by contacting and rubbing against the corner of the stack of lumber, and the protector may be installed without disconnecting the cable by just loosening the cable and inserting the protector under the cable and mounting the protector on the top corner of the stack of lumber and then tightening the cable, said cable alignment tab means comprising two upright tabs in alignment, and a third upright tab spaced from the two aligned tabs by at least the diameter of the cable so as to receive the cable in the space between the two aligned tabs and the third tab, said retention finger means having a support base extending perpendicularly from the outer side wall member and retention fingers extending horizontally and at a right angle from the outer end of the support base, two of the retention fingers being mounted in alignment on the outer sidewall with their fingers pointing in the same direction, a third retention finger being mounted on the outer sidewall spaced away from the two aligned retention fingers and with its finger pointed in a direction opposite to the two aligned fingers so as to form a space between said two aligned retention finger members and said third retention finger so that the fingers capture and retain the tie down cable in said space, loosening the tie-down cable on the railroad freight car, placing the corner protector on the top corner of the stack of lumber under the tie-down cable, threading the tie down cable through the retention fingers of the outer sidewall of the corner protector, threading the cable through the alignment tabs of the top wall of the corner protector, and tightening down the tie down cable to hold the protector in place on the top corner of the stack of lumber.

* * * * *